UNITED STATES PATENT OFFICE.

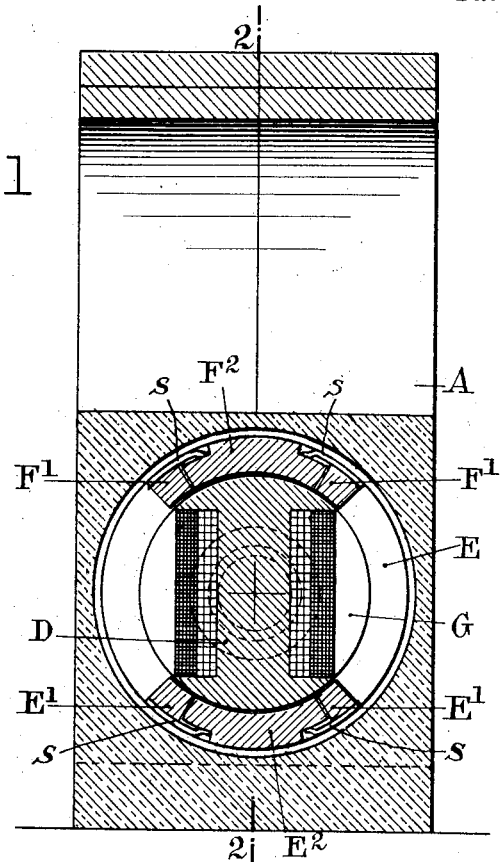
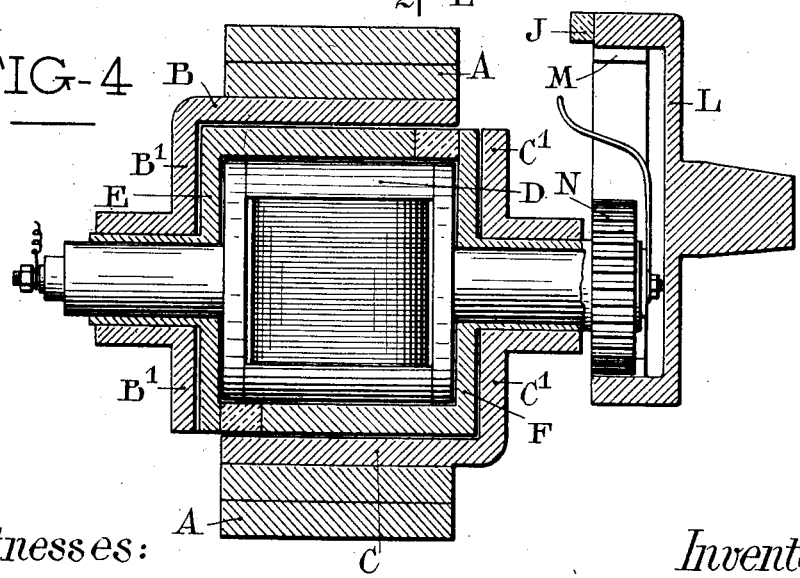

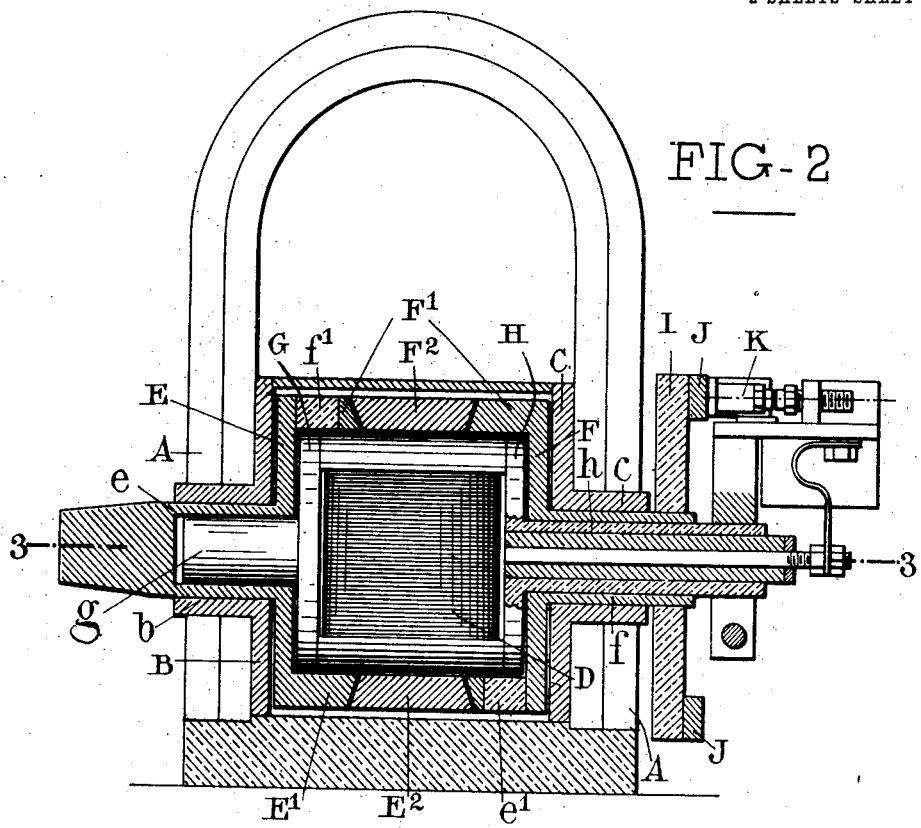
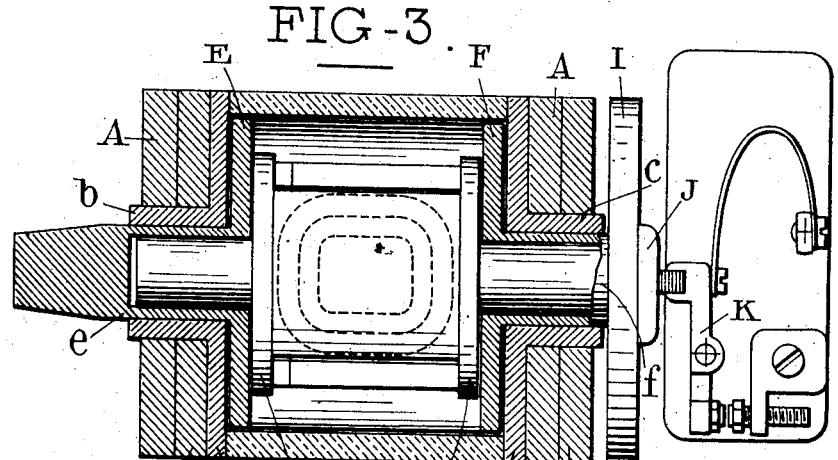

ALBERT KELLER-DORIAN, OF LYON, FRANCE.

DEVICE FOR THE PRODUCTION OF INDUCED CURRENTS IN MAGNETO MACHINES AND DYNAMOS.

1,095,118. Specification of Letters Patent. Patented Apr. 28, 1914.

Application filed December 7, 1912. Serial No. 735,452.

*To all whom it may concern:*

Be it known that I, ALBERT KELLER-DORIAN, a citizen of the French Republic, residing at Lyon, in France, have invented certain new and useful Improvements in Devices for the Production of Induced Currents in Magneto Machines and Dynamos, of which the following is a specification.

The object of the present invention is a device for generating induced currents in magneto machines, dynamos and other induction generators, while causing alternations of the inductive flux through the armature coil, by means of an armature having polarized flanges movable in the magnetic field and rotating around the coil, which flanges are capable of adjustment to produce variations of the phase of maximum induction. With this device may be combined a means for regulating the electromotive force of the induced currents, by varying proportionately to the angular speed the gap which separates the armature from the armature coil.

An embodiment of a high tension ignition magneto constructed in accordance with the invention is illustrated in Figures 1 to 3 of the annexed drawings, in which—

Fig. 1 is a section through the axis of the device. Fig. 2 is a section of the same on line 2—2 of Fig. 1, and Fig. 3 a section on line 3—3 of Fig. 2. Fig. 4 is a horizontal section on the axis of the armature of a second embodiment of this magneto.

Referring to Figs. 1 to 3, A represents permanent or electro magnets, which form the source of the magnetic energy; B and C are two polar members arranged between the poles of the magnets, but these separate members may be dispensed with by constructing the poles of the magnets so as to form them. In the construction represented the polar members have bearings $b$ and $c$ for reception of the journals $e$ and $f$ of circular disks E and F of magnetic metal, which can revolve parallel to the inner faces of the members B and C or of the poles of the magnets. On its other face each of said disks has one or more flanges $E^1$, $F^1$ of circular segmental form having the peripheral angle which assures maximum efficiency of the device. These flanges are arranged perpendicularly to the plane of the disks. The two members thus formed are assembled and joined together by means of two sectors $e^1$, $f^1$ of non-magnetic material which insures their insulation. Within this structure is the armature coil formed by a Siemens coil D laterally supported by two disks G and H of non-magnetic material which are provided with trunnions $g$ and $h$ mounted in journals $e$ and $f$ of the disks E F. One of said trunnions at least projects beyond its bearing at one side to hold the coil in place and on the other hand to collect by means of fixed connections the induced currents passing from the primary coil to the circuit breaker as well as those passing from the secondary coil to the distributer if required, and to the sparking plugs.

One of the disk journals for instance $f$ carries a disk I rotatable with it and on which are formed bosses J of the ignition cams. The circuit breaker K is supported by the trunnion $h$ of the coil, thus being stationary and for this reason can be advantageously placed parallel to the axis of rotation of the armature and in the position shown in Figs. 2 and 3 corresponding to the best conditions of visibility and facility of maintenance, but if required it could however be arranged perpendicularly to the axis of the armature as usual.

With this construction each of the disks E and F is in permanent contact with the same pole of the source of magnetic energy. The result is that the flanges of each disk actually constitute movable polar masses of constant magnetism and consequently not subject to the influences of hysteresis, thus being equivalent in fact to magnets revolving around the coil. If each disk has only one flange the effect of the movement of the armature is to cause the flux to pass alternately into the core of the coil at each half revolution of the flanges producing an induced current in the coils. By increasing the number of flanges of the armature there may be obtained for each revolution as many induced currents as desired, the number of the latter being always equal to the number of flanges.

The spark is obtained, as usual, by the movement of the bosses J on the disk I relatively to the circuit breaker K and can be easily produced at the moment of maximum induction by regulating the position of the circuit breaker. This regulation should correspond to a determined position of the coil relatively to that of the armature at the moment under consideration. As the disk I rotates with the flanges of the armature and the circuit breaker is rigidly connected with the coil which itself may be displaced, the result is that whatever the position of the coil the spark may be produced at any moment by the advancement or reversal of the coil, while preserving all the intensity of the spark, whereby advance or retardation of ignition can be obtained under the best conditions. Another advantage relating to the ignition and which results from the arrangement of the circuit breaker consists in the fact that very sudden breaks may be obtained by reason of the large diameter which may be given to cam disk I.

It is to be noted that the flanges have no coils and are composed of perfectly balanced parts of slight inertia. Under these conditions they may be given a much greater speed than that which is generally admissible with ordinary coils. From a practical point of view this advantage permits of obtaining angular speeds of the armature which give a very high efficiency at slow running particularly at the moment of starting.

According to the construction shown in Fig. 4, the driving member L of the magneto drives the armature at high speed, for instance by means of a multiplying gear train M and N, but to avoid the production of an unnecessary spark at the moment of disengagement the cam J is fixed on the rim of the driving member L rotating at the speed of the motor and the circuit breaker is held opposite the cam in the manner previously explained, with reference to Figs. 1 and 3. This means of rotating the armature at any speed allows greater facility in applying magnetos to motors having cylinders arranged angularly in star formation, as well as to six or eight-cylinder motors. Finally it would be equally possible to create a higher relative speed of the armature with respect to the coil by giving the latter a rotatory movement in the opposite direction to that of the armature.

Another constructive modification also shown in Fig. 4 consists in providing the polar members B and C with flanges $B^1$ and $C^1$ bent back at right angles with regard to the poles of the magnet and between which the disks E and F of the armature rotate with sufficient clearance. This arrangement allows of placing the axis of rotation of the flanges in the axis of the magnets, whereas in the previously described arrangement the axis of the flange must pass through the poles. This arrangement is evidently applicable to the type of magneto represented in Figs. 1 to 3.

The arrangement of the movable armature surrounding the coil has the advantage of enabling the voltage of the current produced to be regulated, whatever the speed of rotation of the armature. For this purpose a part $E^2$ and $F^2$ of each of the flanges $E^1$ and $F^1$ is made movable so as to be able to move away slightly under the effect of centrifugal force, the reaction of which is partly compensated for by suitable antagonistic springs. In this manner, when the angular speed increases, the movable parts are thrown outward and increase the gap which separates them from the coil and thus proportionately reduce the flux which passes through the latter.

It will be understood that the characteristic features of the invention, although especially described as applicable to magnetos may be applied (with suitable modifications) to dynamos and other induction generators.

What I claim as my invention and desire to secure by Letters Patent of the United States is:—

1. In a magneto machine or dynamo a source of magnetic energy, a rotating armature composed of two disks of magnetic material disposed in proximity to the poles of said source of energy, a coil within said rotating armature, and constantly polarized flanges on said disks adapted for displacement relatively to the coil to produce variations of flux therein.

2. In a magnetic machine or dynamo, a source of magnetic energy, a rotating armature composed of two disks of magnetic material disposed in proximity to the poles of said source of energy, a coil within said rotating armature, constantly polarized flanges on said disks adapted for displacement relatively to the coil to produce variations of flux therein, a circuit breaker in connection with the coil, and an ignition cam rotatable with the armature and coacting with said circuit breaker.

3. In a magnetic machine or dynamo, a source of magnetic energy, a rotating armature composed of two disks of magnetic material disposed in proximity to the poles of said source of energy, a coil within said rotating armature, constantly polarized flanges on said disks adapted for displacement relatively to the coil to produce variations of flux therein, a circuit breaker in connection with the coil, and an ignition cam rotatable with the armature and coacting with said circuit breaker, said coil and circuit breaker being relatively displaceable to vary the moment of ignition.

4. In a magnetic machine or dynamo, a source of magnetic energy, a rotating armature composed of two disks of magnetic material disposed in proximity to the poles of said source of energy, a coil within said rotating armature, polarized flanges on said disks adapted for displacement relatively to the coil to produce variations of flux therein, a circuit breaker in connection with the coil, an ignition cam rotatable with the armature and coacting with said circuit breaker, a member rotating at the speed of the motor adapted to impart rotation to said armature, said member carrying the ignition cam and speed increasing gearing between said member and the armature.

5. In a magneto machine or dynamo a source of magnetic energy, a rotating armature composed of two disks of magnetic material disposed in proximity to the poles of said source of energy, a coil within said rotating armature, and polarized flanges on said disks adapted for displacement relatively to the coil to produce variations of flux therein, said flanges including members adapted for movement under centrifugal force to vary the gap between the flanges and the coil in proportion to their angular speed.

In witness whereof I have signed this specification in the presence of two witnesses.

ALBERT KELLER-DORIAN.

Witnesses:
  JOAN GERMSAIN,
  GUILLAUME PIOCHE.

---

Copies of this patent may be obtained for five cents each, by addressing the "Commissioner of Patents, Washington, D. C."